United States Patent [19]

Akaiwa et al.

[11] Patent Number: 4,817,116
[45] Date of Patent: Mar. 28, 1989

[54] DIGITAL RADIO COMMUNICATION SYSTEM UTILIZING QUADRATURE MODULATED CARRIER WAVES

[75] Inventors: Yoshihiko Akaiwa; Yoshinori Nagata; Yoshio Matsuo, all of Tokyo, Japan

[73] Assignee: NEC Corporation, Tokyo, Japan

[21] Appl. No.: 722,256

[22] Filed: Apr. 12, 1985

[30] Foreign Application Priority Data

Apr. 17, 1984 [JP] Japan ............................ 59-76788
Apr. 19, 1984 [JP] Japan ............................ 59-57533[U]
Apr. 19, 1984 [JP] Japan ............................ 59-57534[U]

[51] Int. Cl.⁴ ............................................ H04L 27/10
[52] U.S. Cl. ................................. 375/49; 375/39; 329/110
[58] Field of Search .................... 375/20, 39, 42, 49, 375/54, 86, 111, 113; 332/16 R; 329/110, 112; 455/111

[56] References Cited

U.S. PATENT DOCUMENTS

| | | | |
|---|---|---|---|
| 3,349,371 | 10/1967 | Brothman et al. | 375/39 |
| 3,845,412 | 10/1974 | Rearwin et al. | 375/86 |
| 3,882,425 | 5/1975 | Briley | 455/111 |
| 4,057,759 | 11/1977 | Genova et al. | 375/86 |
| 4,347,616 | 8/1982 | Murakami | 375/53 |
| 4,528,526 | 7/1985 | McBiles | 375/54 |

Primary Examiner—Robert L. Griffin
Assistant Examiner—Stephen Chin
Attorney, Agent, or Firm—Sughrue, Mion, Zinn, Macpeak, and Seas

[57] ABSTRACT

In order to achieve the spectrum economy and reduce the power consumption of a transmitter and reduce the error rate at a receiver and simplify receiver circuitry, at least one bit stream to be transmitted is quadrature modulated in a manner that the signal points do not define a trace on a complex amplitude plane which passes through the origin of the plane coordinates or in the vicinity thereof. The received signal is hard limited and frequency-discriminated to determine the instantaneous angular velocity of the received signal and is integrated to detect the phase variation between two consecutive received signals, and thereafter is decided with respect to the phase variation according to the decision threshold levels 0 and $\pm \pi$ radians.

4 Claims, 5 Drawing Sheets

DIGITAL RADIO COMMUNICATION SYSTEM UTILIZING QUADRATURE MODULATED CARRIER WAVES

BACKGROUND OF THE INVENTION

1. Field of the Invention

The present invention relates to a digital radio communication system, and more specifically to such a system which is well-suited for mobile radio communications and which utilizes linear quadrature modulated waves to transmit a binary digital signal.

2. Description of the Prior Art

Recent developments in digital techniques, particularly digital modulation and demodulation techniques, have rendered digital communication systems a reality. However, in order to practically realize such a system in which economical transmission of information is possible while maintaining confidentiality and high quality, it is necessary to meet the following various technical requirements:

(1) the transmission spectrum should be sufficiently narrow to enable effective use within the limited radio frequencies;

(2) the transmitter should have a low power consumption; and (3) the receiver should be highly compact, simple and feature excellent error correction characteristics for level variations in the received signal.

One known technique directed to meeting the above-mentioned requirements, is disclosed on pages 534 to 542 of a paper presented by Frank de Jager et al in the IEEE Transactions on Communications, Vol. COM-26 No. 5, entitled "Tamed Frequency Modulation, A Novel Method to Achieve Spectrum Economy in Digital Transmission". This Tamed Frequency Modulation (TFM) is a digital non-linear type for transmitting digital information using a modulated carrier signal with a constant envelope. The TFM has resulted from efforts to improve the transmission spectrum in an MSK (Minimum Shift Keying) system which have been developed in the field of satellite communication. This prior art is particularly suitable for use in mobile radio communication systems which require effective suppression of interchannel interference and low power consumption.

The TFM method can utilize a saturated type class C power amplifier in view of the fact that the modulated carrier signal has a constant envelope. Although such a power amplifier features low power consumption, the transmission spectrum of the TFM method depends on the frequency bandwidth of baseband signal and modulation index, and hence is inherently wide relative to a linear modulation method. In order to narrow the transmission spectrum with the above-mentioned prior art, special circuitry is needed for partial response waveshaping of the modulation signals. This means that, in a mobile communication system wherein the channel spacing is 25 kHz (for example), the upper maximum limit of a signal transmission rate is restricted to 16K bits/second. Further, in the case where a receiver utilizes a coherent detection, as discussed in the above-mentioned prior art, the receiver becomes complex due to the recovery of a coherent carrier signal, thereby lowering the error rate performance of received signals due to carrier signal phase slipping caused by fast fading.

On the other hand, in a digital linear modulation system, the spectrum of the modulated carrier signal can be narrowed by utilizing the baseband signals which are derived from a low-pass filter as the modulation signals. The modulated carrier signal in this instance, however, is not constant in its envelope and hence is apt to reduce the power efficiency in that a class A amplifier is required. Further, the receiver installed in such a system requires an automatic gain controller to compensate for received signal level variations. In particular mobile radio communication systems are subject to level variations exceeding 100 dB due to the fading and transmission path variations, so that the receivers thereof become undesirably complex and bulky.

SUMMARY OF THE INVENTION

It is therefore a primary object of the present invention to provide a digital radio communication system which includes a transmitter featuring spectrum economy and a high power efficiency.

Another object of the present invention is to provide a digital radio communication system which includes a receiver featuring excellent error characteristics (viz., an error rate) when receiving signals with large level variations.

Another object of the present invention is to provide a digital radio communication system which is provided with a transmitter featuring spectrum economy and a high power efficiency, and with a receiver which features excellent error characteristics when incoming signals are subject to large amount of level variations.

Still another object of the present invention is to provide a small, simple type digital radio communication system which is well-suited for installation in mobile radio stations such as automobiles and ships and also in ground radio stations having relatively small capacities.

These objects are fulfilled by arrangements wherein at least one bit stream to be transmitted is quadrature-modulated in a manner that the signal points do not define a trace on a complex amplitude plane which passes through the origin of the plane coordinates or in the vicinity thereof, and wherein a received signal is hard limited and frequency-discriminated to determine the instantaneous angular velocity of the received signal and is integrated to detect the phase variation between two consecutive received signals, and thereafter is decided with respect to the phase variation according to the decision threshold levels 0 and $\pm \pi$ radians.

A first aspect of the present invention takes the form of a digital radio communication system comprising a transmitter which includes a modulator for generating a linear quadrature modulated carrier signal. This carrier signal has signal points which are defined on a complex amplitude plane according to binary digital signals to be transmitted. The signal points define traces each of which is non-intersective with and spaced from the origin of the complex amplitude plane. The transmitter further includes a linear power amplifier adapted to amplify the output of the modulator and is provided with means for compensating non-linearity of the amplified signal.

A second aspect of the present invention takes the form of a digital radio communication system comprising a receiver which includes: an amplitude limiter for hard limiting a received linear quadrature modulated carrier signal. This carrier signal has signal points which are defined on a complex amplitude plane according to binary digital signals to be transmitted. The signal points define traces each of which is non-intersective with and spaced from the origin of the complex amplitude plane. The receiver further includes a demodulator which determines the instantaneous angular velocity of the received signal according to the hard limited signal applied from the amplitude limiter and which integrates the instantaneous angular velocity during a time duration which corresponds to one period of the binary digital signal. The demodulator detects an actual phase variation between two consecutive received signal points. The receiver further includes a decision circuit for determining a correct phase variation between the two consecutive received signal points.

A third aspect of the present invention takes the form of a digital radio communication system comprising a transmitter and a receiver. The transmitter includes a modulator for generating a linear quadrature modulated carrier signal. This carrier signal has signal points which are defined on a complex amplitude plane according to binary digital signals to be transmitted. The signal points define traces each of which is non-intersective with and spaced from the origin of the complex amplitude plane. The transmitter further includes a linear power amplifier adapted to amplify the output of the modulator. The power amplifier includes means for compensating non-linearity of the amplified signal.

The receiver including an amplitude limiter for hard limiting a received linear quadrature modulated carrier signal. This carrier signal has signal points which are defined on a complex amplitude plane according to binary digital signals to be transmitted. The signal points define traces each of which is non-intersective with and spaced from the origin of the complex amplitude plane. The receiver further includes a demodulator which determines the instantaneous angular velocity of the received signal according to the hard limited signal applied from the amplitude limiter and which integrates the instantaneous angular velocity during a time duration which corresponds to one period of the binary digital signal. The demodulator detects an actual phase variation between two consecutive received signal points. The receive still further includes a decision circuit for determining a correct phase variation between the two consecutive received signal points.

BRIEF DESCRIPTION OF THE DRAWINGS

The features and advantages of the present invention will become more clearly appreciated from the following description when taken in conjunction with the accompanying drawings in which like blocks and circuits are denoted like reference numerals and in which.

DETAILED DESCRIPTION OF THE PREFERRED EMBODIMENTS

Figure 1:
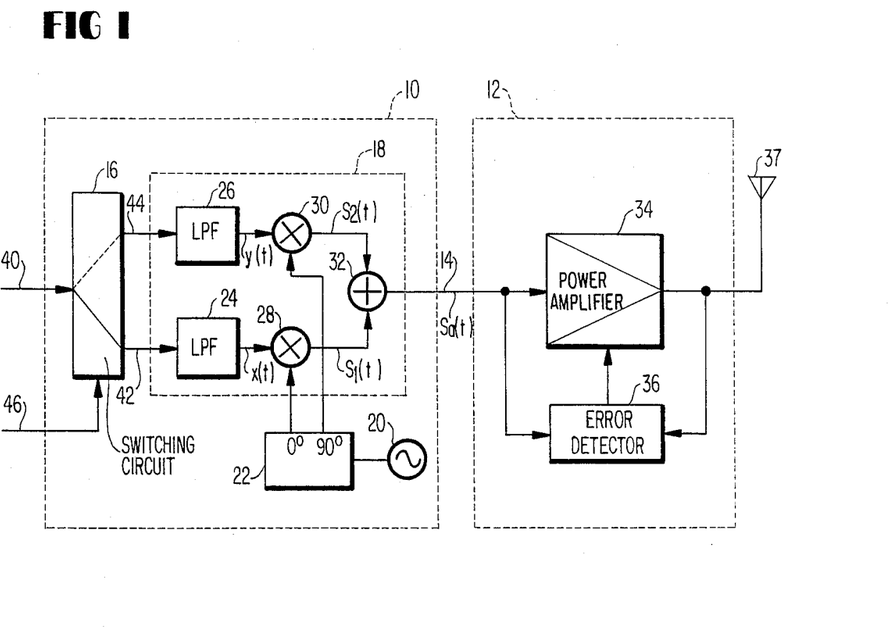
FIG. 1 is a block diagram of a first example of the transmitter for use in an embodiment of the present invention.

Reference is now made to FIG. 1, wherein there is shown in block diagram form a first example of a transmitter for use in an embodiment of the present invention. The transmitter comprises a linear quadrature modulating circuit 10 and a linear power amplifying circuit 12 interconnected by a line 14. The modulating circuit 10 includes a switching circuit 16, a modulating section 18, a local oscillator 20, and a phase splitter 22. The modulating section 18 includes in this embodiment two low-pass filters (LPF) 24 and 26, two balanced modulators 28 and 30, and an adder 32, all of which are coupled as shown. On the other hand, the power amplifier 12 includes a linear power amplifier 34 and an error detector 36. The output of the amplifier 34 is transmitted through an antenna 37. All the circuitry shown in FIG. 1 are of conventional types, so that detailed description thereof will be omitted for simplicity.

The switching circuit 16 is supplied, via a line 40, with a binary digital signal (impulses) to be transmitted. The switching circuit 16 applies alternately, at each time slot, the incoming signal to the low-pass filters 24 and 26 over lines 42 and 44 in response to clock pulses which are applied via a line 46. The low-pass filter 24 applies the outputs thereof (viz., a baseband signal x(t)) to the balanced modulator 28, while, similarly, the other low-pass filter 26 applies the outputs thereof (viz., a baseband signal y(t)) to the balanced modulator 30. The phase splitter 22 is supplied with the carrier signal from the local oscillator 20, and outputs two signals (viz., $\sin\omega_c t$ and $\cos\omega_c t$ wherein $\omega_c$ is the angular frequency of the carrier wave) which differ in phase by $\pi/2$ radians with each other. The balanced modulators 28 and 30 modulate $\cos\omega_c t$ and $\sin\omega_c t$ with the baseband signals x(t) and y(t), respectively. The modulated signals S1(t) and S2(t) are added at the adder 32 which applies a multiplexed signal Sa(t) to the amplifying circuit 12 via the line 14.

The multiplexed signal Sa(t) is represented by the following equation:

$$Sa(t) = S1(t) + S2(t) \quad (1)$$
$$= x(t)\cos\omega_c t + y(t)\sin\omega_c t$$

The baseband signals x(t) and y(t) are given by the following equations (2) and (3):

$$x(t) = \sum_{m=-\infty}^{\infty} a_{2m} h(t - 2mT) \quad (2)$$

$$y(t) = \sum_{m=-\infty}^{\infty} a_{2m+1} h(t - (2m+1)T) \quad (3)$$

wherein each of $a_{2m}$ and $a_{2m+1}$ assumes either $+1$ or $-1$ according to the value of the binary digital signal to be transmitted, h(t) accounts for an impulse response of each of the low-pass filters 24 and 26, and T accounts for a period of the bit stream applied to the switching circuit 16.

As mentioned above, the signal Sa(t) is obtained by multiplexing the two modulated signals x(t)cosω$_c$t and y(t)sinω$_c$t. Consequently, the signal Sa(t) assumes values denoted by signal points "o" and "x" on the complex amplitude plane shown in FIG. 2, wherein TRJ1 through TRJ4 indicate traces defined by the signal points. The two signal points "o" on the I-axis have in-phase components with respect to the carrier signal, while the two signal points "x" on the Q-axis have quadrature components with respect to the carrier signal. The two signal points on each of the I- and Q-axes corresponds to either +1 or −1 of the baseband signal, and hence each signal point is represented by a 1 bit/symbol. It should be noted that the signal traces, TRJ1 through TRJ4, do not pass through the origin P of the complex amplitude plane or in the vicinity of the origin P. This is because one of the signal points "o" and one of the signal points "x" are alternately selected. The modulating scheme as mentioned above, may be termed "π/2-radian shift BPSK (Binary Phase Shift Keying)". The advantages derived from this modulating scheme will be discussed in detail later.

As seen from equation (1), the spectrum of the multiplexed signal Sa(t) is occupied by the frequency bandwidth of the baseband signal x(t) (or y(t)) in a symmetrical manner about the carrier frequency. Consequently, the transmission spectrum is twice that of the baseband signal. The actual shape of the transmission spectrum is determined by the frequency characteristics of the low-pass filters 24 and 26. Each low-pass filter is preferably a raised-cosine roll-off Nyquist filter which has the frequency characteristics given by the following equation (4):

$$H(\omega) = \int_{-\infty}^{\infty} h(t)e^{-j\omega t}dt \quad (4)$$

$$= \begin{cases} 1 \ldots |\omega/2\pi| \leq (1-\alpha)/2T \\ \frac{1}{2} - \frac{1}{2}\sin\frac{\omega/2\pi - \frac{1}{2}T}{\alpha} \cdot \frac{\pi}{2} \quad |\omega/2\pi| \geq (1-\alpha)/2T \\ 0 \ldots |\omega/2\pi| > (1+\alpha)/2T \end{cases}$$

wherein α is a roll-off factor (a positive integer less than unity). If such a low-pass filter is utilized, the transmission bandwidth W of the modulated carrier signal is give by the following equation (5).

$$W = 2(1+\alpha) \cdot \frac{1}{2}T \quad (5)$$

The transmission bandwidth W can be narrowed by arranging the modulation circuit 10 to increase the number of the signal points.

Figure 3:
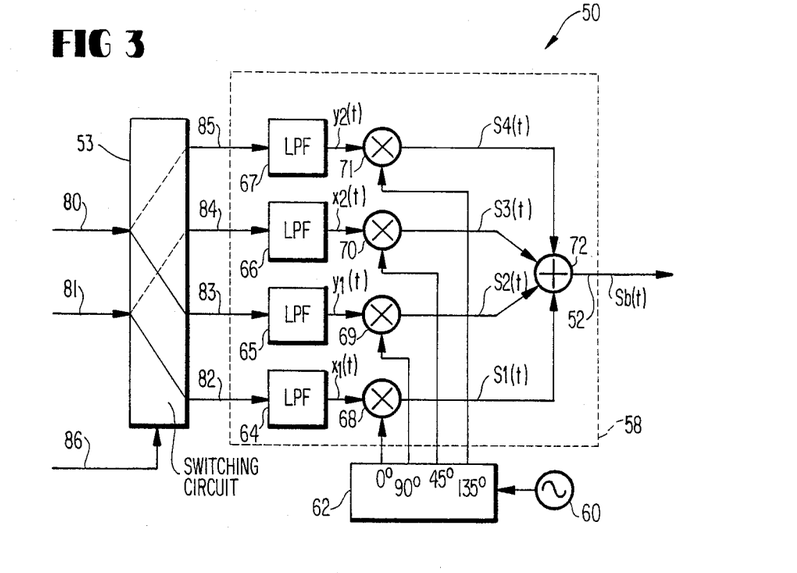
FIG. 3 is a block diagram of a second example of the transmitter.
Figure 4:
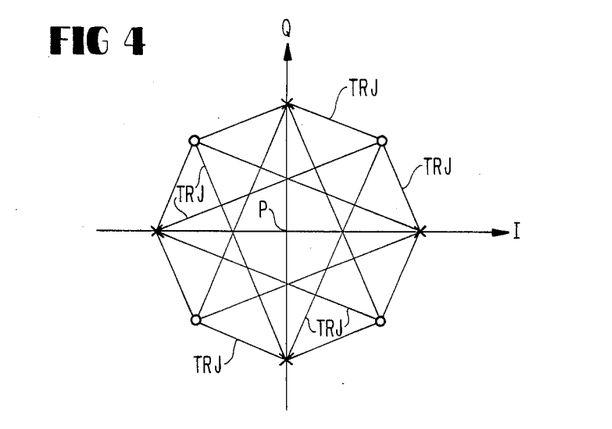
FIG. 4 is a signal space diagram showing signal points of a linear modulated carrier signal derived from the FIG. 3 arrangement and traces defined by the signal points.

FIG. 3 is a block diagram showing a linear quadrature modulating circuit 50 of a second example of a transmitter for use in the present invention. With this arrangement, the number of signal points is doubled, as shown in FIG. 4, as compared with the FIG. 1 arrangement. The modulating circuit 50 is the same as the that shown in FIG. 1 except that the circuit 50 is arranged to modulate the carrier signal with two bit streams.

The modulating circuit 50 includes a switching circuit 56, a modulating section 58, a local oscillator 60, and a phase splitter 62. The modulating section 58 includes four low-pass filters (LPF) 64, 65, 66 and 67, four balanced modulators 68, 69, 70 and 71, and an adder 72. The output of the modulating circuit 50 is fed to a linear power amplifier which is not shown but arranged in the same manner as the power amplifier 14 shown in FIG. 1.

The switching circuit 56 is supplied, via lines 80 and 81, with two kinds of binary digital signals (impulses) to be transmitted. The switching circuit 56 applies alternately, at each time slot, the incoming two bit streams to the low-pass filters 64–65 and 66–67 over lines 82–83 and 84–85, respectively, in response to clock pulses which are applied via a line 86. The filters 64 and 65 apply the outputs thereof (viz., baseband signal x$_1$(t) and y$_1$(t)) to the balanced modulators 68 and 69, respectively. Similarly, the other low-pass filters 66 and 67 apply the outputs thereof (viz., baseband signal x$_2$(t) and y$_2$(t)) to the balanced modulators 70 and 71, respectively. The phase splitter 62 is supplied with the carrier signal from the local oscillator 60, and outputs four signals (viz., cosω$_c$t, sinω$_c$t, cos(ω$_c$t+π/4) and sin(ω$_c$t+π/4)) which differ in phase by π/4 radians with each other. The balanced modulators 68, 69, 70 and 71 respectively modulate cosω$_c$t, sinω$_c$t, cos(ω$_c$t+π/4), and sin(ω$_c$t+π/4) with the associated baseband signals x$_1$(t), y$_1$(t), x$_2$(t), and y$_2$(t), and generate modulated signals S1(t), S2(t), S3(t) and S4(t). These modulated signals S1(t) through S4(t) are combined at the adder 72 which applies the multiplexed signal Sb(t) to the amplifying circuit (not shown in FIG. 3) via a line 52. The signal Sb(t) is given by the following equation:

$$\begin{aligned} Sb(t) &= S1(t) + S2(t) + S3(t) + S4(t) \\ &= x_1(t)\cos\omega_c t + y_1(t)\sin\omega_c t + \\ &\quad x_2(t)\cos(\omega_c t + \pi/4) + \\ &\quad y_2(t)\sin(\omega_c t + \pi/4) \end{aligned} \quad (6)$$

The baseband signals x$_1$(t) through y$_2$(t) are given by the following equations (7) to (10).

$$x_1(t) = \sum_{m=-\infty}^{\infty} a_{2m} h(t - 2mTs) \quad (7)$$

$$y_1(t) = \sum_{m=-\infty}^{\infty} b_{2m} h(t - 2mTs) \quad (8)$$

$$x_2(t) = \sum_{m=-\infty}^{\infty} a_{2m+1} h[t - (2m+1)Ts] \quad (9)$$

$$y_2(t) = \sum_{m=-\infty}^{\infty} b_{2m+1} h[t - (2m+1)Ts] \quad (10)$$

wherein each of a$_{2m}$, b$_{2m}$, a$_{2m+1}$ and b$_{2m+1}$ assumes either +1 or −1 according to the value of the binary digital signal to be transmitted, and Ts is a symbol interval of the one pair of incoming signals which are applied to the switching circuit 56. As a consequence, the symbol interval is twice the bit interval (viz., Ts=2T). As mentioned previously, each low-pass filter is preferably designed to have its frequency characteristics given by equation (4), in the case of which the bit interval T should be replaced with Ts. Therefore, the transmission bandwidth is given by $$W = 2(1+\alpha) \cdot \frac{1}{2}Ts$$

Consequently, in the case where the channel spacing is 25 KHz as with the conventional mobile radio communication systems, we may obtain the symbol transmission rate $f_{baud}$:

$$f_{baud} = 1/T_s = 25 \times 10^3/(1+\alpha) \qquad (11)$$

Inasmuch as one symbol corresponds to 2 bits in this case, the bit repetition rate fb is $2f_{baud}$. Consequently, it follows that if the roll-off factor α is 0.56, fb becomes 32 K bits/second which is approximately two times that of known mobile radio transmission systems.

The linear power amplifier 12, consisting in this embodiment f the power amplifier 34 and the error detector, is of conventional type, so that the operation will be omitted.

FIG. 4 is a space diagram showing signal points of the modulated carrier signal Sb(t) and traces defined by the signal points, wherein the signal points are denoted by "o" and "x" and the traces defined by the signal points are indicated by solid lines TRJ. Each signal point is represented by 2 bits/symbol, and adjacent signal points differ in phase by π/4. The signal points "x" and "o" are alternately arranged in order of phase magnitude. As clearly seen from FIG. 4, each signal trace does not pass through the origin P of the plane coordinate or in the vicinity thereof. The modulation method thus discussed with reference to FIGS. 3 and 4, may be termed "π/4-radian shift QPSK (Quadrature Phase Shift Keying)".

It is understood that the FIG. 3 arrangement allows the transmission bandwidth and rate to be improved as compared with the modulator 10 shown in FIG. 1.

The present invention thus far discussed is concerned with the cases in which two and four signal points are utilized. In general, according to the present invention, increasing the signal points leads to a narrower transmission bandwidth and higher transmission rate.

Figure 5:
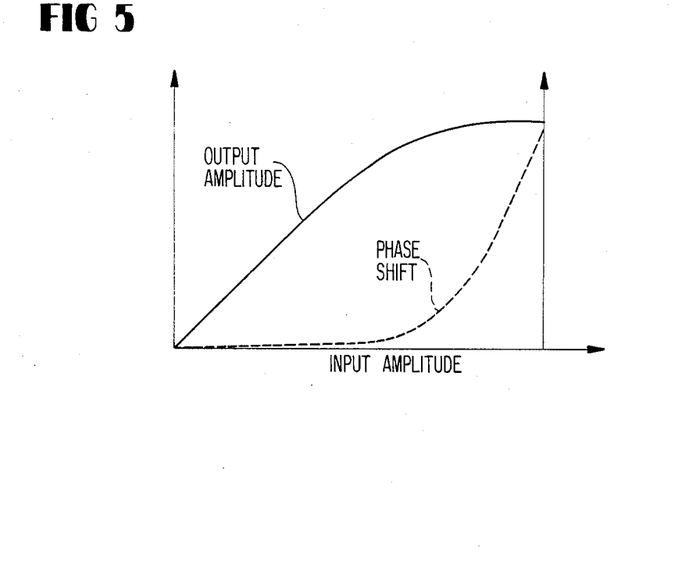
FIG. 5 is a graph showing input-and-output characteristics of the linear power amplifier forming part of the arrangement shown in FIG. 1.

The multiplexed signal Sa(t) or Sb(t) is then applied to the power amplifier. FIG. 5 shows a general example of the input-output characteristic of a usual amplifier. As seen from FIG. 5, as the input amplitude increases, nonlinearity, caused by amplitude saturation and phase shift, increases which are respectively known as AM-to-AM and AM-to-PM conversions. It is known that odd harmonics allows the spectrum to widen. Various attempts, therefore, have been made to compensate for the nonlinearity.

Previously proposed techniques (analog type) directed to solving the problem, are disclosed, for example, in U.S. Pat. No. 3,900,823 or on pages 44 to 49 of a paper by V. Petrovic presented in the IEE Conference on Radio Spectrum Conservation Techniques, Sep. 1983, entitled "Reduction of Spurious Emission from Radio Transmitters by Means of Modulation Feedback". These known techniques utilize a feedback loop for returning the gain and phase of a received signal, but they encounter a drawback in that effective compensation is not achieved. This arises from the fact that the analog signal intersects the origin of the complex amplitude plane coordinates and thus increases the dynamic range.

On the contrary, according to the present invention, the traces defined by the signal points do not pass through the origin P or in the vicinity thereof, and hence the above-mentioned problems inherent in the prior art are all but overcome.

Figure 6:
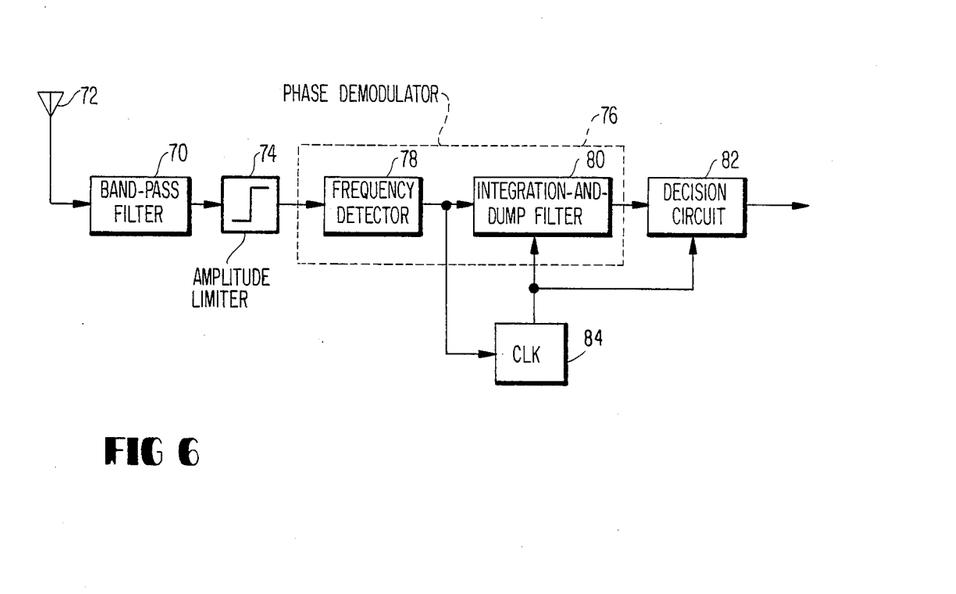
FIG. 6 is a block diagram of an example of the receiver for use in the embodiment of the present invention.

Referring now to FIG. 6, there is shown in block diagram form an example of a receiver for use in an embodiment of the present invention. The FIG. 6 arrangement includes a band-pass filter 70 having its input coupled to a receiving antenna 72, an amplitude limiter 74 for hard limiting the output of the filter 70, a phase demodulator 76 consisting of a frequency detector 78 and an integration-and-dump filter 80, a decision circuit 82, and a clock signal regenerator 84 which controls the filter 80 and the decision circuit 82.

The band-pass filter 70 is supplied, through the antenna 72, with the quadrature modulated carrier signal (Sa(t) or Sb(t)). The band-passed signal from the filter 70 is then hard limited to a predetermined level at the amplitude limiter 74.

It should be noted that in the FIG. 6 arrangement, the amplitude limiter 74 is utilized instead of an automatic gain controller (AGC). This follows from the fact that the transmitter according to the present invention produces a linear quadrature modulated signal whose signal traces, as mentioned above, do not pass through the origin P of the complex amplitude plane or in the vicinity thereof. Since the use of the AGC, which renders circuitry complex, is avoided, the receiver shown in FIG. 6 is simple and compact. It is very advantageous to use the amplitude limiter 74 in place of the AGC particularly in the case where a dynamic range expands up to 100 dB such as in mobile radio communication systems.

The amplitude limiter 74 applies the hard limited signal to the next stage, viz., the phase demodulator 76.

The phase demodulation of the FIG. 6 arrangement will be discussed with reference to FIGS. 7 and 8, wherein the incoming signal is assumed to be the modulated signal Sa(t) (viz., the output of the FIG. 1 arrangement).

Figure 7:
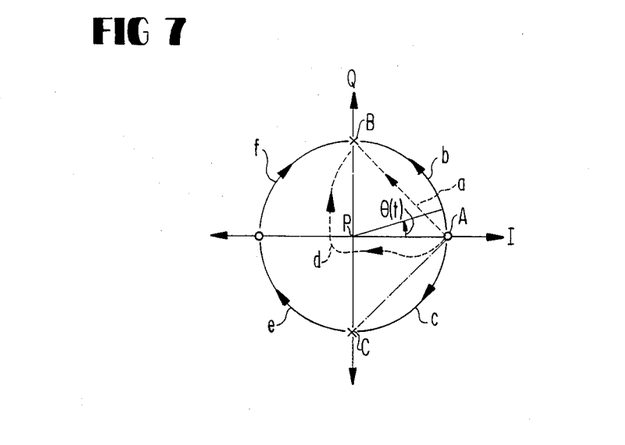
FIG. 7 is a signal space diagram showing the received signal points and the traces defined by the output signals which appear in the FIG. 6 arrangement.
Figure 8:
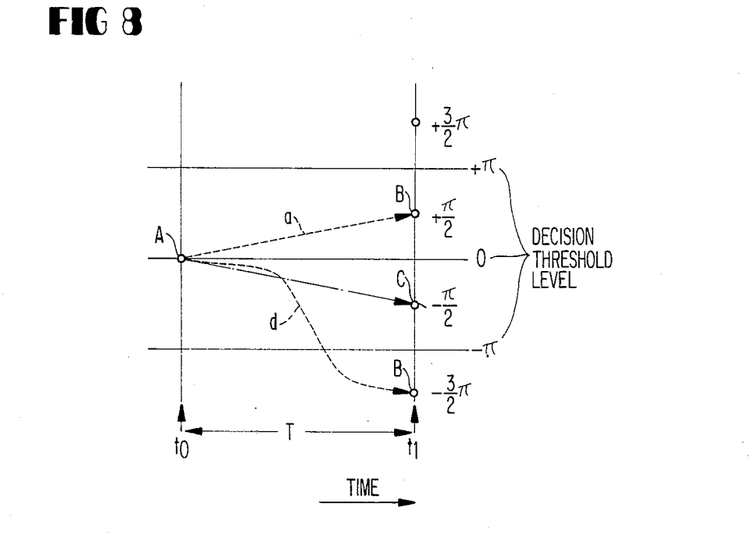
FIG. 8 is a chart showing decision threshold levels for determining the phase variation in the received signal.

Let it be assumed that the modulated carrier signal is completely free from any disturbance during transmission and also within the receiver itself, and assuming that the received signal changes from a signal point A (indicated by "o") on the I-axis to a signal point B (indicated by "x") on the Q-axis (FIG. 7). In this instance, the trace defined by the output signal of the band-pass filter 70 is represented by a straight broken line "a", while the trace defined by the output signal (viz., the hard limited signal) of the amplitude limiter 74 is indicated by a circular arc "b". The frequency detector 78 is supplied with the output of the limiter 74 and detects the instantaneous angular velocity of the received signal along the trace "b". The instantaneous angular velocity ω(t) is given by the following equation (12):

$$\omega(t) = d/dt \cdot \theta(t) = d/dt[\tan^{-1} y(t)/x(t)] \qquad (12)$$

The value of the angular velocity ω(t), obtained at the frequency detector 78, is integrated during the one symbol time duration at the integration-and-dump filter 80. The output of the filter 80, viz., the phase variation between the two consecutive signal points, is generally represented by the following equation (13):

$$\int_{(n-1)T}^{nT} \omega(t)dt = \qquad (13)$$

$$\int_{(n-1)T}^{nt} [d/dt \cdot \theta(t)]dt = \theta(nT) - \theta(n-1)T$$

In the above-mentioned particular case, the output of the filter 80 indicates the phase difference +π/2 radians.

On the other hand, assuming that the signal applied to the antenna 72 changes from the signal point A to another signal point C on the Q-axis (such as shown in phantom) and assuming that this signal is also not affected by noise, then in this instance, the output of the amplitude limiter 74 is indicated by a circular arc "c". As a result, the output of the filter 80 indicates the phase difference $-\pi/2$ radians.

Consequently, if the signals to be transmitted are modulated such that the phase variation between two consecutive signals assumes either $+\pi/2$ or $-\pi/2$, then the decision circuit 82 is capable of reproducing the original signal (viz., the binary digital signal applied to the transmitter) according to the output of the phase detector 76.

The operations of the decision circuit 82 will be discussed with reference to FIGS. 6 to 8.

If the signal applied to the antenna 72 is not degraded by noise during transmission, the phase difference during one symbol time duration assumes $+\pi/2$ or $-\pi/2$ as mentioned above. Therefore, the decision circuit 82 can output the replica of the original signal according to the decision threshold level (viz., 0 radian).

However, the modulated signal is frequently degraded due to noise during transmission and/or within the receiver itself. As a consequence, when the signal point of the received modulated signal changes from the point A to the point B, the output of the band-pass filter 70 may trace along a broken line "d" for example. In this case, the output of the amplitude limiter 74 traces circular arcs "c", "e" and "f" in this order. Therefore, the integration-and-dump filter 80 generates a signal which corresponds to a phase difference $-3/2\pi$. As a result, if the decision circuit 82 determines this output of the filter 80 on the basis of 0 radian, then the circuit 82 is apt to produce an erroneous result. However, this problem is overcome by arranging the decision circuit 82 to treat $-3\pi/2$ radians as $+\pi/2$ radians. More specifically, two more decision threshold levels $+\pi$ and $-\pi$ radians are added to the above-mentioned level 0 radian, as shown in FIG. 8 wherein T is one symbol time duration defined by time points $t_0$ and $t_1$.

Thus, if the phase difference $\Delta\theta$ is detected between $-\pi$ and $-2\pi$ radians, $\Delta\theta$ is assumed $(2\pi+\Delta\theta)$, while if the detected phase difference $\Delta\theta$ falls between $+\pi$ and $+2\pi$, then $\Delta\theta$ is assumed $(-2\pi+\Delta\theta)$. This scheme is extendable to the case where the phase difference detected exceeds $+2\pi$ radians, wherein the actual phase difference is assumed $(2n\pi+\Delta\theta)$ (wherein n is an integer). This means that the phase variation is determined by modulo $2\pi$. Thus, the phase difference undesirably exceeding $+\pi/2$ during transmission and/or within the receiver itself, is compensated for.

Figure 2:
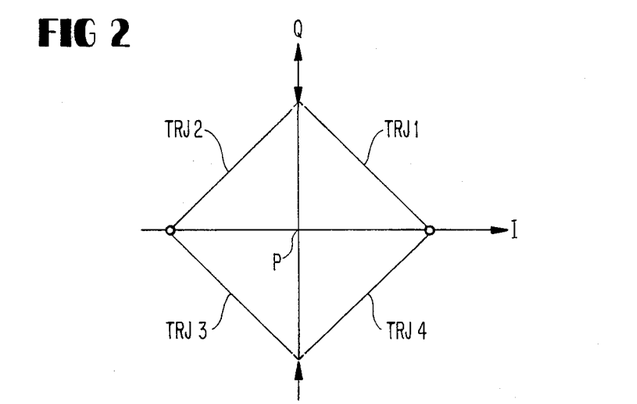
FIG. 2 is a signal space diagram showing signal points of a quadrature modulated carrier signal derived from the FIG. 1 arrangement and the traces defined by the signal points.

The above-mentioned decision on the basis of modulo $2\pi$ is especially suitable in the case where the number of signals increases as referred to in FIGS. 3 and 4, and wherein the signal traces pass relatively close to the origin point P (FIG. 4) as compared in the case of FIG. 2.

According to computer simulation by the inventors wherein the receiver of FIG. 6 was assumed to detect the $\pi/4$ shift QPSK modulated signals by way of the modulo $2\pi$, it was proven that the carrier wave to noise power ratio, needed to render the error rate $10^{-3}$, can be improved up to approximately 2 dB.

In the foregoing, the receiver shown in FIG. 6 has been described in the case of receiving $\pi/2$ shift BPSK modulated signals. Similarly, the same discussion is applicable to the case where the receiver is supplied with $\pi/4$ shift QPSK and more multivalued modulated signals, although the phase difference of the adjacent signals is $+\pi/4$, $+3\pi/4$, ..., respectively.

The foregoing description shows only preferred embodiments of the present invention. Various modifications are apparent to those skilled in the art without departing from the scope of the present invention which is only limited by the appended claims.

What is claimed is:

1. A digital radio communication system comprising a receiver which includes:

an amplitude limiter for hard limiting a received linear quadrature modulated carrier signal, said carrier signal having signal points which are defined on a complex amplitude plane according to binary digital signals to be transmitted, said signal points defining traces each of which is non-intersective with and spaced from the origin of the complex amplitude plane;

a demodulator which determines the instantaneous angular velocity of the received signal according to the hard limited signal applied from said amplitude limiter and which integrates the instantaneous angular velocity during a time duration which corresponds to one period of the binary digital signal, said demodulator detecting an actual phase variation between two consecutive received signal points; and a decision circuit for determining a correct phase variation between the two consecutive received signal points.

2. A digital radio communication system as claimed in claim 1, wherein said demodulator includes:

a frequency detector having the input thereof coupled to the output of said amplitude limiter, said frequency detector determining said instantaneous angular velocity according to said hard limited signal applied thereto;

an integrator having the input thereof coupled to the output of said frequency detector, said integrator integrating the instantaneous angular velocity during a time duration which corresponds to one period of the binary digital signal in order to detect the actual phase variation.

3. A digital radio communication system as claimed in claim 1, wherein said decision circuit detects the correct phase variation by assuming the actual phase variation ($\Delta\theta$) as $(2n\pi+\Delta\theta)$ (wherein n is an integer).

4. A digital radio communication system comprising a transmitter and a receiver, said transmitter including:

a modulator for generating a linear quadrature modulated carrier signal, the carrier signal having signal points which are defined on a complex amplitude plane according to binary digital signals to be transmitted, said signal points defining traces each of which is non-intersective with and spaced from the origin of the complex amplitude plane; and a linear power amplifier adapted to amplify the output of said modulator, said power amplifier including means for compensating non-linearity of the amplified signal, said receiver including:

an amplitude limiter for hard limiting a received linear quadrature modulated carrier signal, said carrier signal having signal points which are defined on a complex amplitude plane according to binary digital signals to be transmitted, said signal points defining traces each of which is non-intersective with and spaced from the origin of the complex amplitude plane;

a demodulator which determines the instantaneous angular velocity of the received signal according to the hard limited signal applied from said amplitude limiter and which integrates the instantaneous angular velocity during a time duration which corresponds to one period of the binary digital signal, said demodulator detecting an actual phase variation between two consecutive received signal points; and a decision circuit for determining a correct phase variation between the two consecutive received signal points.

* * * * *

UNITED STATES PATENT AND TRADEMARK OFFICE
CERTIFICATE OF CORRECTION

PATENT NO. : 4,817,116

DATED : March 28, 1989

INVENTOR(S) : Yoshihiko Akaiwa et al

It is certified that error appears in the above-identified patent and that said Letters Patent is hereby corrected as shown below:

Column 3, line 43 delete "receive" and insert --receiver--;

Column 6, line 26, delete "mbdulated" and insert --modulated--;

Column 9, line 48, delete "+ $2\pi$" and insert --$\pm 2\pi$--;

Column 9, line 52, delete "+ $\pi/2$" and insert --$\pm \pi/2$--;

Column 10, line 4, delete "+ $\pi/4$, + $3\pi/4$" and insert --$\pm \pi/4$, $\pm 3\pi/4$--;

Signed and Sealed this

Seventeenth Day of April, 1990

*Attest:*

HARRY F. MANBECK, JR.

*Attesting Officer*   *Commissioner of Patents and Trademarks*